Oct. 15, 1929.    H. A. AFFEL    1,731,239
THERMOMILLIAMMETER
Filed Jan. 15, 1927    2 Sheets-Sheet 1

INVENTOR.
H. A. Affel
BY
ATTORNEYS.

Oct. 15, 1929.  H. A. AFFEL  1,731,239
THERMOMILLIAMMETER
Filed Jan. 15, 1927  2 Sheets-Sheet 2

INVENTOR.
H. A. Affel
BY
ATTORNEYS.

Patented Oct. 15, 1929.

1,731,239

UNITED STATES PATENT OFFICE.

HERMAN A. AFFEL, OF RIDGEWOOD, NEW JERSEY, ASSIGNOR TO AMERICAN TELEPHONE AND TELEGRAPH COMPANY, A CORPORATION OF NEW YORK

THERMOMILLIAMMETER

Application filed January 15, 1927. Serial No. 161,445.

This invention relates to current measuring devices and particularly to means for determining the magnitude of high frequency currents.

In the measurement of alternating currents of frequencies higher than the usual power frequencies, ordinary types of electrodynamic measuring instruments are not satisfactory. The means commonly employed to measure high frequencies, particularly those employed in carrier signaling systems, is the thermocouple meter circuit. The thermocouple serves to convert high frequency currents into direct currents which can be registered on a sensitive meter. The alternating currents traverse an extremely fine wire which is called the heater circuit. This wire is in contact with a thermocouple junction, and the potential generated thereby, which varies with the degree of heat produced, is indicated by a very sensitive galvanometer or microammeter.

For precise measurement, it is necessary to calibrate each thermocouple separately since the variation between thermocouples may be appreciable in view of the delicacy of their construction.

This invention resides in a device which is adapted not only to determine the magnitude of a high frequency current but also to calibrate the translating device employed in such measurement as, for example, a thermocouple or other device performing the same function.

Figure 1:
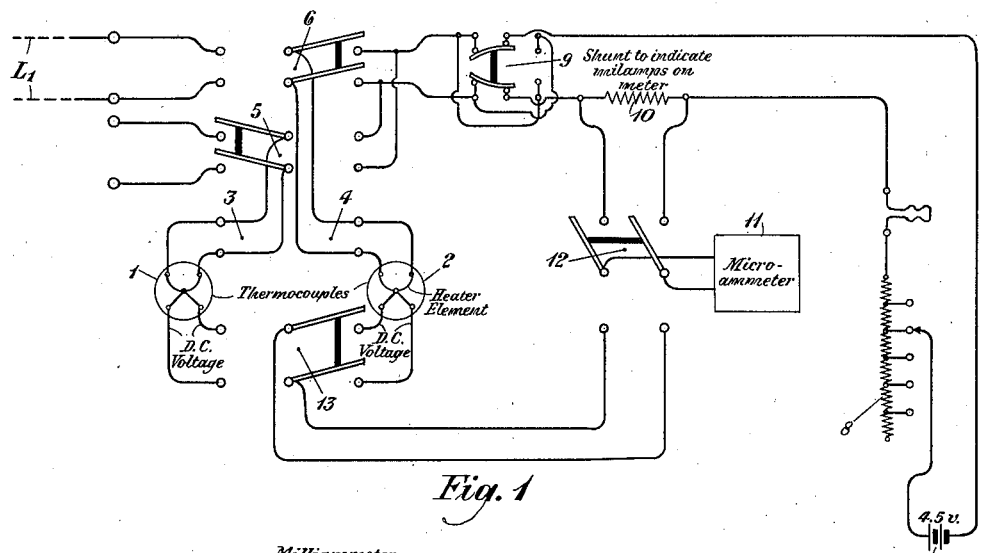
Figure 3A:
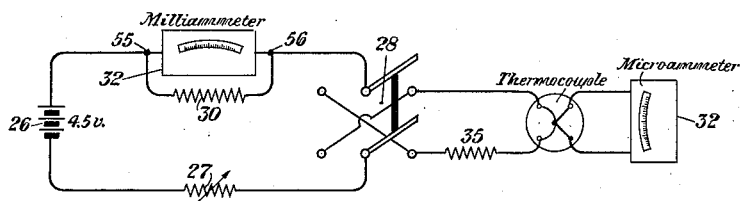
Figure 3B:
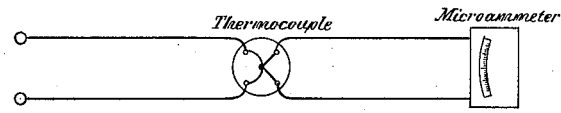
Figure 3C:
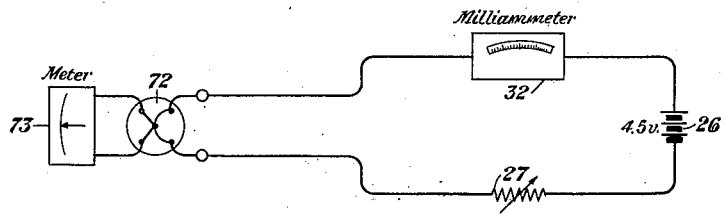
Figure 2:
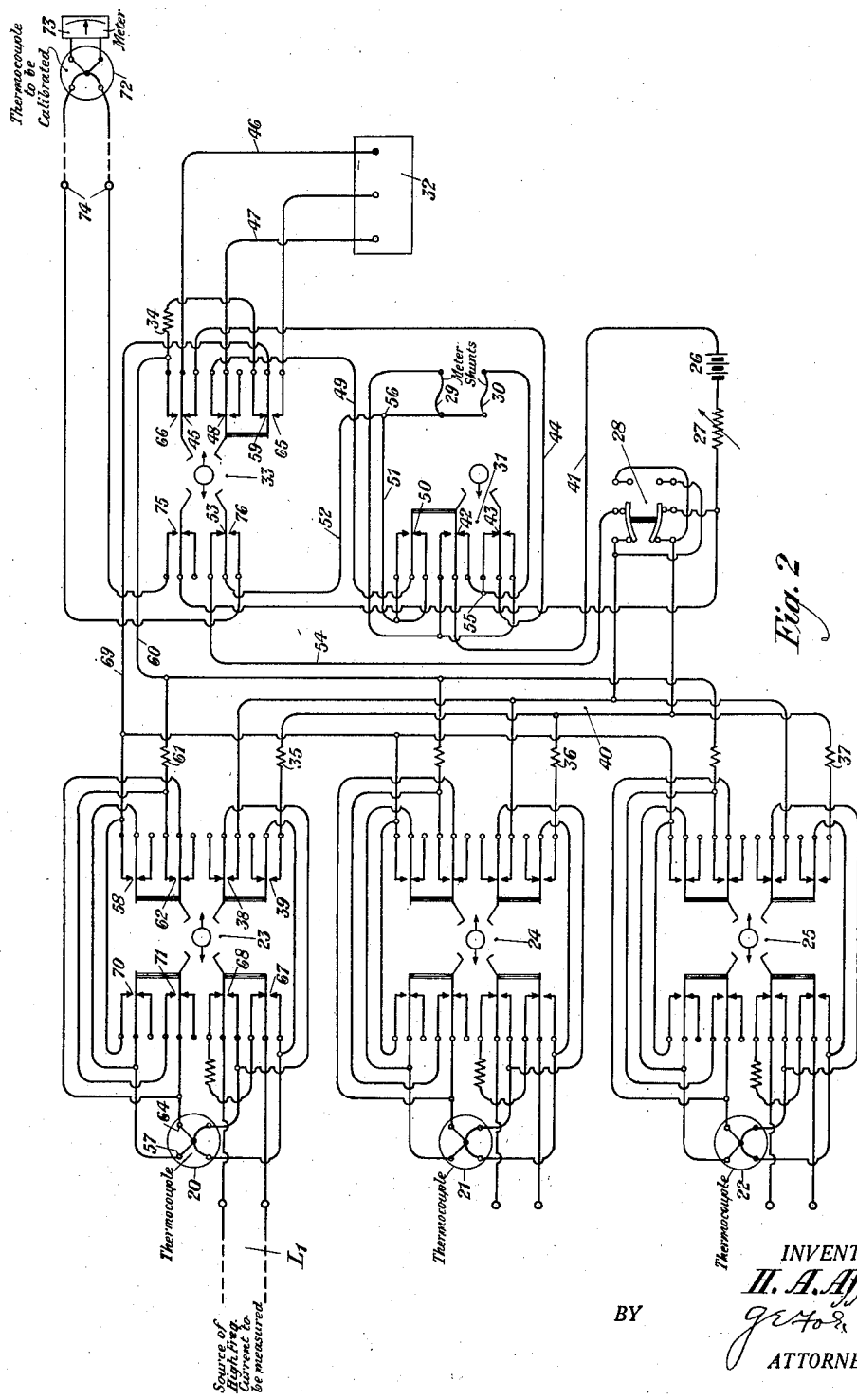

This invention will be clearly understood from the following description when read in connection with the attached drawing, of which Figure 1 shows schematically the embodiment of the invention; Fig. 2 is a detailed wiring diagram of a measuring set which has been shown schematically in Fig. 1; and Figs. 3ª, 3ᵇ and 3ᶜ illustrate the description of the circuit shown in Fig. 2.

In Fig. 1, 1 and 2 represents thermocouples having their heating elements connected with the input circuits 3 and 4 which are connected with the movable contacts of the switches 5 and 6, respectively. These switches serve to connect the thermocouples either with a source of high frequency whose magnitude is to be determined such as the line $L_1$ connected across the left-hand contacts of switch 6; or through the right-hand contacts with a source of direct current 7 whose magnitude may be varied by means of the resistance 8. The source 7 is employed in the calibration of the thermocouples. The circuit connected with the said source also includes a reversing switch 9 and a shunt 10 across which a microammeter 11 may be connected by means of the switch 12. The voltage elements namely those in which a direct voltage is produced by the flow of high frequency current in the heating elements, are connected with the left and right contacts of switch 13. The movable contacts of this switch are connected with the lower contacts of switch 12.

The sensitivity of a thermocouple is dependent to a large extent, on the resistance of the heating element and it is desirable to point out that thermocouples differing in the resistances of their heating elements have been employed in order to obtain a sufficiently wide range of measurement. Thus, couple 1 may have a resistance of 600 ohms and would be employed to measure currents between .2 and 2 milliamperes while couple 2, having a resistance of 40 ohms would be employed to measure currents between 2 and 10 milliamperes. Also since many open wire telephone circuits have an impedance of approximately 600 ohms the thermocouple with a resistance of 600 ohms may be used to measure small currents received from such a line without any additional steps being necessary to insure a good impedance match.

In the operation of the circuit shown in Fig. 1, each thermocouple is calibrated prior to its connection with a line circuit or other source of high frequency current. Thus, switch 5 is operated to the right and switch 12 upwardly, thereby connecting the source 7 through the reversing switch 9 (which may be in either position) with the heating element of couple 1. It is important that all of the resistance of element 8 shall be in the circuit in order to avoid such an excess of current through the heating element as to injure it. The said operation of switch 12 connects the ammeter 11 across the shunt 10 and furnishes an indication of direct current that flows through the heating element of the couple. If the current as indicated by 11 is not sufficiently large to furnish a desirable measurement, the resistance 8 may be varied until a suitable indication is given, then the switch 13 is operated to the left and switch 12 downwardly, which operation serves to connect the meter 11 across the voltage element of couple 1. The voltage indicated by the meter 11 is the direct voltage produced by the thermocouple as the result of the heat generated by the flow of a direct current of the magnitude indicated by the meter 11 when it was connected across the shunt 10. The reversing switch 9 is then operated to reverse the connections of the source 7 with the couple 1 and the voltage produced thereby is noted. If the readings are different for different positions of the switch 9, the average of the readings is taken as the voltage that would be produced by an equivalent alternating current of the magnitude indicated by the meter 11 when connected across the shunt 10. In like manner, the thermocouple 2 may be calibrated. The couples are now ready to be employed for the measurement of high frequency currents such, for example, as carrier currents employed on the line $L_1$. As a general proposition, a test man has an idea of the approximate magnitude of the current employed on a particular line or produced by a particular source. If this current is relatively large, couple 2 would be employed by operating the switch 6 to the left and switch 13 to the right and switch 12 downwardly. Switch 5 would be in neutral position. The high frequency current flowing from the line $L_1$ over the branch 4 and through the heating element of couple 2 would produce a direct voltage whose magnitude would be indicated by a microammeter 11. The prior calibration of couple 2 shows that for a given voltage indication of meter 11, the current through the heating element is of a definite magnitude. In this way, the magnitude of the high frequency current flowing over the line $L_1$ may be quite accurately determined.

The arrangement shown in Fig. 2 is a more practical embodiment of the invention shown schematically in Fig. 1. This arrangement shows three couples 20, 21 and 22 which are connected with the switches 23, 24 and 25. By means of these switches, the couples may be connected either with a source of high frequency current such as the line $L_1$ shown in connection with couple 20 or with a calibrating circuit. The calibrating circuit includes a source of direct current 26, a variable resistance 27, a reversing switch 28, shunts 29 and 30, a switch 31 controlling these shunts, a microammeter 32 and a switch 33 which controls the connection of the meter with the calibrating circuit. A resistance 34 is also shown whose function will be clear from subsequent description. The resistances 35, 36 and 37 serve to protect the couples against excess currents while calibrating. Since all of the couples and the switches 23, 24 and 25 are connected in parallel with the calibrating and measuring apparatus, it will suffice to describe the method of employing couple 20. In calibrating, the switch 23 is operated to the right which connects the heating element through the contacts 38 and 39 and circuit 40 with the contacts of the reversing switch 28. With the switch in the position shown, the lower middle contact is connected with a circuit that includes the resistance 27, the source 26, conductor 41, contacts 42 and 43 of key 31, conductor 44, contact 45 of key 33, conductor 46, the meter 32, conductor 47, contact 48 of key 33, conductor 49, contact 50 of key 31, conductors 51 and 52, contact 53 of key 33, conductor 54 to the upper middle contact of key 28 connecting there with the circuit 40 which in turn is connected with the heating element of couple 20. The meter 32 is shunted when key 31 is in its normal position, the shunt extending from the junction point 55, through the shunt 30 to the junction point 56 between conductors 51 and 52. The circuit just traced is shown schematically in Fig. 3ª. In making this calibration, the rheostat 27 is set so that its full resistance is in the circuit to adequately protect the couple. The rheostat is then manipulated so as to reduce the resistance until the current which is indicated by the meter 32, which current is that flowing through the heating element of the couple 20, is of a desired value. When this current is noted, the switch 33 is operated to the right thus disconnecting the meter 32 from the circuit of the source 26 and placing the meter 32 across the voltage element of the couple 20 in substitution for the resistance 34. The shunt 30 which was associated with the meter in the circuit of the source 26 is left in position therein and the total resistance of this circuit, which, it will be recalled, includes the heating element, is not measurably affected. The manner in which the meter 32 is connected across the voltage element will be clear by tracing the circuit of this element when the switch 33 is in its normal position and when it is operated to the right. When in normal position, the circuit of the voltage element of couple 20 extends from the terminal 57, contact 58 of switch 23, contact 59 of switch 33, resistance 34, conductor 60, resistance 61, contact 62 of switch 23 and terminal 64 of the heating element. When switch 33 is operated to the right, the resistance 34 is disconnected but the meter 32 is connected in place thereof through contact 65 of key 33, conductor 46, contact 66 of key 33. In order to simplify the sketch in Fig. 3ª, separate ammeters have been shown to avoid the introduction of the switching apparatus necessary to transfer the meter from the circuit of the calibrating source to the voltage element of the couple being calibrated. After the meter 32 has been transferred to the voltage element of couple 20 and the voltage produced by the known current in the heating element has been indicated, the reversing switch 38 is thrown to its other position and the voltage for that position is noted. If any difference of voltage exists, the average voltage is assumed for the current flowing through the heating element. When the couple has been calibrated throughout the range desired, it is connected with the source of high frequency such as the line $L_1$ for measurement of the magnitude of the current flowing thereover. This connection which is shown schematically in Fig. 3$^b$, is affected by operating switch 23 to the left thereby connecting line $L_1$ through the contacts 67 and 68 of switch 23. With switch 33 in its right-hand position, the meter 32 is connected across the voltage element of couple 20 through contacts 65 and 66 of key 33, conductors 60 and 69, resistance 61 and contacts 70 and 71 of key 23. By means of the calibration curve of the couple 20, the magnitude of the current flowing over the line $L_1$ may be accurately determined. Resistance 61 and corresponding resistances in other couple circuits are of such value as to give the desired range of reading for each couple.

The resistances 35, 36 and 37 are of such value as to prevent more than a given maximum current flowing in the circuit of the heating element. Their purpose is to prevent a burning out of this element during calibration.

It is frequently desirable to calibrate a thermocouple that forms part of the fixed apparatus of another circuit such as a repeater test circuit. Such a thermocouple is indicated by 72 at the right-hand side of the drawing. A meter 73 is shown connected with the voltage element of this couple. To calibrate this couple, its heating element is connected as indicated by dotted lines with the terminals 74 which are connected with the contacts 75 and 76 at the left-hand side of switch 33. By operating this switch to the left, the source 26, the resistance 27, the meter 32 and either of the shunts 29 or 30, depending upon the position of switch 31, will be connected with the heating element of couple 72. By varying the resistance 27 and noting the readings of 72 and 73, the calibration of the couple may be made. The circuit is shown schematically in Fig. 3$^c$.

The invention which resides broadly in means for calibrating the translating device of a high frequency measuring circuit, which is shown schematically in the aforedescribed drawings, may be embodied in different forms without departing from the spirit and scope of the appended claims.

What is claimed is:

1. In a device for determining the magnitude of high frequency currents, the combination with a thermo-electric device comprising a heating element and a voltage element across which a direct voltage may be set up by the current in said heating element, of a source of calibrating current connected with the said heating element, the connection including means to vary the magnitude of the said calibrating current, and means to measure the magnitude thereof, a resistance connected across the voltage element of the said device, and switching means to disconnect the said measuring means from the said source and to substitute the said measuring means for the said resistance across the voltage element of the said device.

2. In a device for determining the magnitude of high frequency currents, the combination with a thermo-electric device comprising a heating element and a voltage element across which a direct voltage may be set up by the current in the heating element, of a calibrating circuit connected with the said heating element comprising a source of direct current, a rheostat and an ammeter connected therewith, a resistance connected across the voltage element, and means to connect the said ammeter across the said voltage element in substitution for the said resistance.

3. In a device for determining the magnitude of high frequency currents, the combination with a thermo-electric device comprising a heating element and a voltage element across which a direct voltage may be set up by the current in said heating element, of a source of calibrating current connected with the heating element thereof, the said connection including means to vary at will the magnitude of the said current, a current measuring device, and a reversing switch, a resistance bridged across the said voltage element and switching means to disconnect the said measuring means from the said source and to connect it across the said voltage element.

In testimony whereof, I have signed my name to this specification this 13th day of January, 1927.

HERMAN A. AFFEL.